US012665225B2

(12) United States Patent
Choi et al.

(10) Patent No.: US 12,665,225 B2
(45) Date of Patent: Jun. 23, 2026

(54) METHOD FOR MANUFACTURING SECONDARY BATTERY AND EQUIPMENT FOR MANUFACTURING THE SECONDARY BATTERY

(71) Applicant: LG ENERGY SOLUTION, LTD., Seoul (KR)

(72) Inventors: Hyun Jun Choi, Daejeon (KR); Soon Ju Choi, Daejeon (KR); Seok Koo Kim, Daejeon (KR); Young Deok Kim, Daejeon (KR); Dae Soo Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 596 days.

(21) Appl. No.: 17/770,581

(22) PCT Filed: Jul. 1, 2020

(86) PCT No.: PCT/KR2020/008586
§ 371 (c)(1),
(2) Date: Apr. 20, 2022

(87) PCT Pub. No.: WO2021/101005
PCT Pub. Date: May 27, 2021

(65) Prior Publication Data
US 2022/0294024 A1 Sep. 15, 2022

(30) Foreign Application Priority Data
Nov. 19, 2019 (KR) ........................ 10-2019-0148932

(51) Int. Cl.
*H01M 10/0587* (2010.01)
*H01M 10/44* (2006.01)

(52) U.S. Cl.
CPC ....... *H01M 10/0587* (2013.01); *H01M 10/44* (2013.01)

(58) Field of Classification Search
CPC .......................... H01M 10/0587; H01M 10/44
See application file for complete search history.

(56) References Cited

U.S. PATENT DOCUMENTS

2003/0167627 A1     9/2003  Fujino et al.
2014/0162117 A1*    6/2014  Matsuno ................. H01M 4/62
                                                          429/188
(Continued)

FOREIGN PATENT DOCUMENTS

CN       103620853 A      3/2014
CN       105449286 A      3/2016
(Continued)

OTHER PUBLICATIONS

Mussa, A. S., et. al., Effects of external pressure on the performance and ageing of single-layer lithium-ion pouch cells, 2018, Journal of Power Science, 385, p. 18-26 (Year: 2018).*

(Continued)

*Primary Examiner* — Brian R Ohara
*Assistant Examiner* — Quintin D. Elliott
(74) *Attorney, Agent, or Firm* — Birch, Stewart, Kolasch & Birch, LLP

(57) ABSTRACT

Discussed is a method for manufacturing a secondary battery, the method including an operation (a) of alternately stacking an electrode and a separator to manufacture an electrode assembly; an operation (b) of laminating the electrode assembly at a pressure of 5 kgf/cm² or more to bond the electrode and the separator, which are provided in the electrode assembly, to each other; an operation (c) of accommodating the electrode assembly in a battery case and injecting an electrolyte into the battery case to seal the
(Continued)

battery case, thereby manufacturing a preliminary battery; an operation (d) of charging and discharging the preliminary battery to activate the preliminary battery; and an operation (e) of aging the preliminary battery at a high temperature of 60° C. to 100° C. for 1 hour to 6 hours to thermally treat the preliminary battery.

13 Claims, 8 Drawing Sheets

(56) References Cited

U.S. PATENT DOCUMENTS

| | | | | |
|---|---|---|---|---|
| 2015/0207167 | A1 | 7/2015 | Ueda et al. | |
| 2016/0261006 | A1 | 9/2016 | Ueno et al. | |
| 2017/0141428 | A1* | 5/2017 | Nakagawa | H01M 4/366 |
| 2017/0309953 | A1 | 10/2017 | Harayama et al. | |
| 2019/0013524 | A1 | 1/2019 | Kim | |
| 2019/0074538 | A1* | 3/2019 | Lee | H01M 4/625 |
| 2019/0190062 | A1* | 6/2019 | Harayama | H01M 50/461 |
| 2019/0237823 | A1 | 8/2019 | Lee et al. | |
| 2020/0227788 | A1* | 7/2020 | Chun | H01M 10/446 |
| 2020/0381702 | A1 | 12/2020 | Song et al. | |
| 2021/0050616 | A1 | 2/2021 | Taguchi et al. | |

FOREIGN PATENT DOCUMENTS

| | | | |
|---|---|---|---|
| JP | 2010-86754 | A | 4/2010 |
| JP | 2013-45759 | A | 3/2013 |
| JP | 5232486 | B2 | 7/2013 |
| JP | 2015-95334 | A | 5/2015 |
| JP | 2015-170508 | A | 9/2015 |
| JP | 2017-106867 | A | 6/2017 |
| JP | 6384729 | B2 | 9/2018 |
| JP | 2018-535516 | A | 11/2018 |
| JP | 6542754 | B2 | 7/2019 |
| JP | 2019-121507 | A | 4/2026 |
| KR | 10-0514164 | B1 | 9/2005 |
| KR | 10-0566080 | B1 | 3/2006 |
| KR | 10-2015-0015303 | A | 2/2015 |
| KR | 20150015417 | A * | 2/2015 |
| KR | 10-2015-0022264 | A | 3/2015 |
| KR | 10-2017-0033601 | A | 3/2017 |
| KR | 10-2017-0035565 | A | 3/2017 |
| KR | 10-1713042 | B1 | 3/2017 |
| KR | 10-1713068 | B1 | 3/2017 |
| KR | 10-2007-0082379 | A | 4/2017 |
| KR | 10-2017-0079292 | A | 7/2017 |
| KR | 10-2017-0087053 | A | 7/2017 |
| KR | 10-2017-0100971 | A | 9/2017 |
| KR | 10-2017-0101582 | A | 9/2017 |
| KR | 10-1784033 | B1 | 10/2017 |
| KR | 10-1830286 | B1 | 2/2018 |
| KR | 10-2018-0082759 | A | 7/2018 |
| KR | 10-2019-0054920 | A | 5/2019 |
| KR | 20190054920 | A * | 5/2019 |
| KR | 10-2019-0101650 | A | 9/2019 |
| KR | 10-2019-0110708 | A | 10/2019 |
| KR | 102045246 | B1 * | 11/2019 |
| WO | WO 2014/045586 | A1 | 8/2014 |
| WO | WO-2015076574 | A1 * | 5/2015 | C08J 7/042 |
| WO | WO 2018/135915 | A1 | 7/2018 |
| WO | WO 2018/143733 | A1 | 8/2018 |
| WO | WO-2019182242 | A1 * | 9/2019 | H01M 10/0413 |
| WO | WO 2019/188719 | A1 | 10/2019 |

OTHER PUBLICATIONS

WO-2015076574-A1 Machine Translation.*
KR-102045246-B1 Machine Translation.*
KR-20190054920-A Machine Translation.*
WO-2019182242-A1 Machine Translation.*
KR-20150015417-A Machine Translation.*
Extended European Search Report dated Oct. 21, 2022 for Application No. 20890795.6.
International Search Report for PCT/KR2020/008586 (PCT/ISA/210) mailed on Sep. 28, 2020.

* cited by examiner

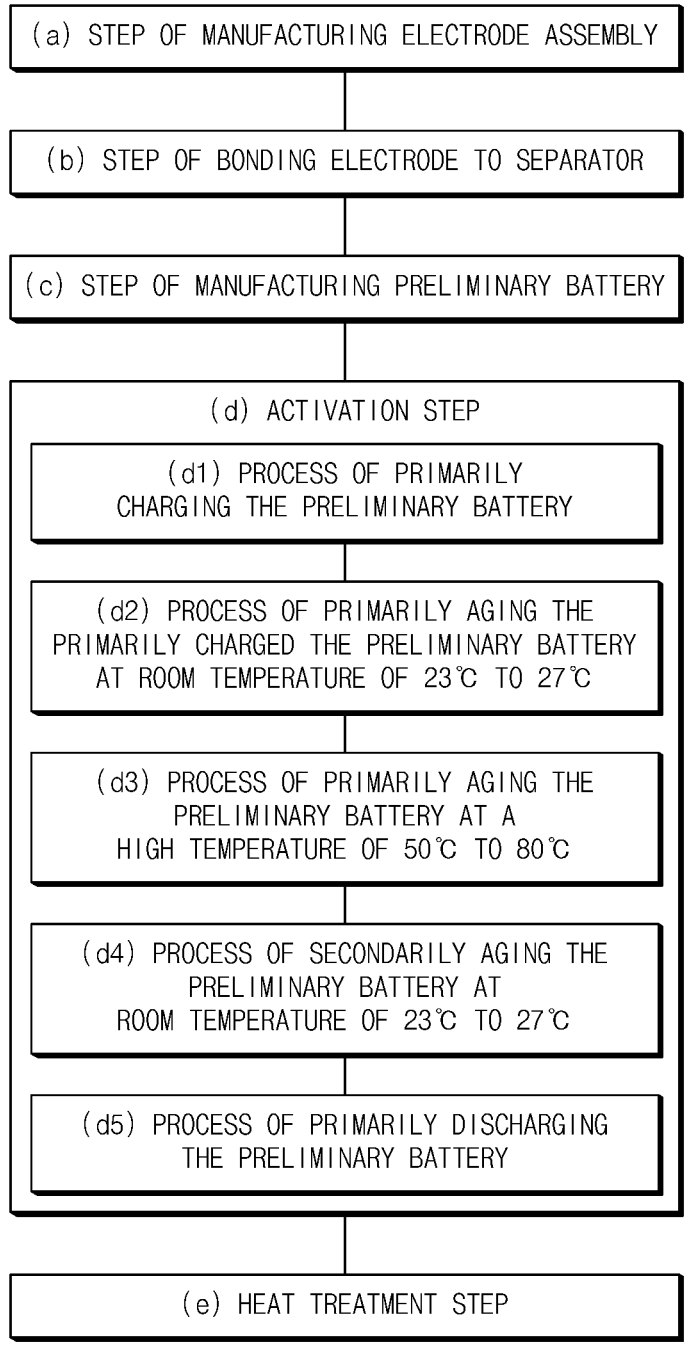

(a) STEP OF MANUFACTURING ELECTRODE ASSEMBLY (b) STEP OF BONDING ELECTRODE TO SEPARATOR (c) STEP OF MANUFACTURING PRELIMINARY BATTERY (d) ACTIVATION STEP (d1) PROCESS OF PRIMARILY
CHARGING THE PRELIMINARY BATTERY (d2) PROCESS OF PRIMARILY AGING THE
PRIMARILY CHARGED THE PRELIMINARY BATTERY
AT ROOM TEMPERATURE OF 23℃ TO 27℃

(d3) PROCESS OF PRIMARILY AGING THE
PRELIMINARY BATTERY AT A
HIGH TEMPERATURE OF 50℃ TO 80℃

(d4) PROCESS OF SECONDARILY AGING THE
PRELIMINARY BATTERY AT
ROOM TEMPERATURE OF 23℃ TO 27℃

(d5) PROCESS OF PRIMARILY DISCHARGING
THE PRELIMINARY BATTERY (e) HEAT TREATMENT STEP

FIG.2

METHOD FOR MANUFACTURING SECONDARY BATTERY AND EQUIPMENT FOR MANUFACTURING THE SECONDARY BATTERY

TECHNICAL FIELD

Cross-Reference to Related Application

The present application claims the benefit of the priority of Korean Patent Application No. 10-2019-0148932, filed on Nov. 19, 2019, the disclosure of which is hereby incorporated by reference in its entirety.

TECHNICAL FIELD

The present invention relates to a method for manufacturing a secondary battery, which is capable of improving process performance and lifespan performance at the same time, and equipment for manufacturing the secondary battery.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

The secondary batteries are classified into a can type secondary battery and a pouch type secondary battery, and the can type secondary battery comprises an electrode assembly, an electrolyte, a can accommodating the electrode assembly and the electrolyte, and a cap assembly mounted on an opening of the can. The pouch type secondary battery comprises an electrode assembly, an electrolyte, and a pouch accommodating the electrode assembly and the electrolyte.

A method for manufacturing the above-described secondary battery comprises a process of manufacturing an electrode assembly, a process of laminating and bonding the manufactured electrode assembly, and a process of accommodating the bonded electrode assembly together with the electrolyte in a case assembly.

However, in the method for manufacturing the above-described secondary battery, if the lamination is strengthened when bonding the electrode assembly, process performance may be improved as bonding strength between an electrode and a separator increases, but battery performance may be deteriorated. On the other hand, when the lamination is weakened, there is a problem in that the bonding strength between the electrode and the separator is weakened, resulting in defects.

DISCLOSURE OF THE INVENTION

Technical Problem

The present invention is invented to solve the above problem, and an object of the present invention is to provide a method for manufacturing a secondary battery, in which an electrode assembly is laminated at a set pressure or more and then aged at a high temperature so as to be thermally treated, thereby improving process performance and battery performance at the same time, and equipment for manufacturing the secondary battery.

Technical Solution

A method for manufacturing a secondary battery according to the present invention for achieving the above object comprises: a step (a) of alternately stacking an electrode and a separator to manufacture an electrode assembly; a step (b) of laminating the electrode assembly at a pressure of 5 kgf/cm$^2$ or more to bond the electrode and the separator, which are provided in the electrode assembly, to each other; a step (c) of accommodating the electrode assembly in a battery case and injecting an electrolyte into the battery case to seal the battery case, thereby manufacturing a preliminary battery; a step (d) of charging and discharging the preliminary battery to activate the preliminary battery; and a step (e) of aging the preliminary battery at a high temperature of 60° C. to 100° C. for 1 hour to 6 hours to thermally treat the preliminary battery.

In the step (e), the high-temperature aging may be performed for 1 hour to 3 hours.

In the step (e), the high-temperature aging may be performed at a temperature of 75° C. to 90° C.

The step (d) may comprise a process of charging and discharging the preliminary battery one or more times and a degassing process.

The degassing may be performed by the aging.

The step (d) may comprise: a process (d1) of primarily charging the preliminary battery; a process (d2) of primarily aging the primarily charged preliminary battery at room temperature of 23° C. to 27° C.; a process (d3) of primarily aging the preliminary battery at a high temperature of 50° C. to 80° C. after the process (d2); a process (d4) of secondarily aging the preliminary battery at room temperature of 23° C. to 27° C. after the process (d3); and a process (d5) of primarily discharging the preliminary battery after the process (d4).

The method may further comprise an additional degassing process between the process (d4) and the process (d5).

The additional degassing process may comprise a process of opening the battery case of the preliminary battery and a process of sealing the battery case again.

The process (d1) may be performed from SOC 10 to SOC 100.

The process (d2) may be performed for 1 day to 5 days.

The process (d3) may be performed for 10 hours to 30 hours.

The process (d4) may be performed for 10 hours to 30 days.

The process (d5) may be performed to be discharged to 6.5 C for 1 minute at SOC 90.

Equipment for manufacturing a secondary battery according to the present invention comprises: an electrode assembly manufacturing device configured to manufacture an electrode assembly by alternately stacking an electrode and a separator; a lamination device configured to laminate the electrode assembly at a pressure of 5 kgf/cm$^2$ or more so as to bond the electrode and the separator to each other; a preliminary battery manufacturing device configured to accommodate the electrode assembly and an electrolyte in a battery case so as to manufacture a preliminary battery; an activation device configured to charge and discharge the preliminary battery so as to activate the preliminary battery; and a heat treatment device configured to age the preliminary battery at a high temperature of 60° C. to 100° C. for 1 hour to 6 hours so as to manufacture the secondary battery.

Advantageous Effects

The method for manufacturing the secondary battery according to the present invention may comprise a step (a) of manufacturing an electrode assembly, a step (b) of laminating the electrode assembly at a pressure of 5 kgf/cm$^2$ or more, a step (c) of manufacturing a preliminary battery, a step (d) of activating the preliminary battery, and a step (e) of aging the preliminary battery at a high temperature to thermally treat the preliminary battery. Therefore, the ion conductivity may be improved through the deformation of the separator. Accordingly, the increase in resistance may be inhibited by inducing the decrease in open circuit voltage (OCV) at the discharge terminal to prevent the battery from being deteriorated and improve the lifespan characteristics. Particularly, it is possible to nondestructively prevent the battery performance from being degraded due to the strong lamination. That is, the process performance and the battery performance may be improved at the same time.

That is, in the method for manufacturing the secondary battery according to the present invention, the lamination may be performed at the pressure of 5 kgf/cm$^2$ or more to significantly increase in bonding strength between the electrode and the separator, and the aging may be performed at the high temperature of 60° C. to 100° C. for 1 hour to 6 hours to improve the concentration polarization resistance, which is disturbed by the lamination, thereby improving the battery performance.

In addition, in the method for manufacturing the secondary battery according to the present invention, the high-temperature aging in the step (e) may be performed at a temperature of 75° C. to 90° C. for 1 hour to 3 hours. Therefore, the electrode assembly that is laminated at the pressure of 5 kgf/cm$^2$ or more may be effectively thermally treated to remarkably improve the battery performance.

In the method for manufacturing the secondary battery according to the present invention, the step (d) may comprise a process of charging and discharging the preliminary battery one or more times and a process of degassing the preliminary battery. Therefore, the preliminary battery may be effectively charged and discharged to be activated.

That is, in the method for manufacturing the secondary battery according to the present invention, the step (d) may comprise a process (d1) of primarily charging the preliminary battery, a process (d2) of aging the primarily charged preliminary battery at room temperature of 23° C. to 27° C., a process (d3) of primarily aging the preliminary battery at a high temperature of 50° C. to 80° C. after the process (d3) and the process (d2), a process (d4) of secondarily aging the preliminary battery at room temperature of 23° C. to 27° C. after the process (d3), and a process (d5) of primarily charging the preliminary battery after the process (d4). Therefore, the charging/discharging efficiency of the preliminary battery may be remarkably improved.

The method for manufacturing the secondary battery according to the present invention may further comprise the additional degassing process between the process (d4) and the process (d5). Therefore, the gas generated in the preliminary battery may be quickly discharged to improve the charging/discharging efficiency.

BRIEF DESCRIPTION OF THE DRAWINGS

FIG. 2 is a flowchart illustrating a method for manufacturing a secondary battery according to the present invention.

MODE FOR CARRYING OUT THE INVENTION

Figure 1:
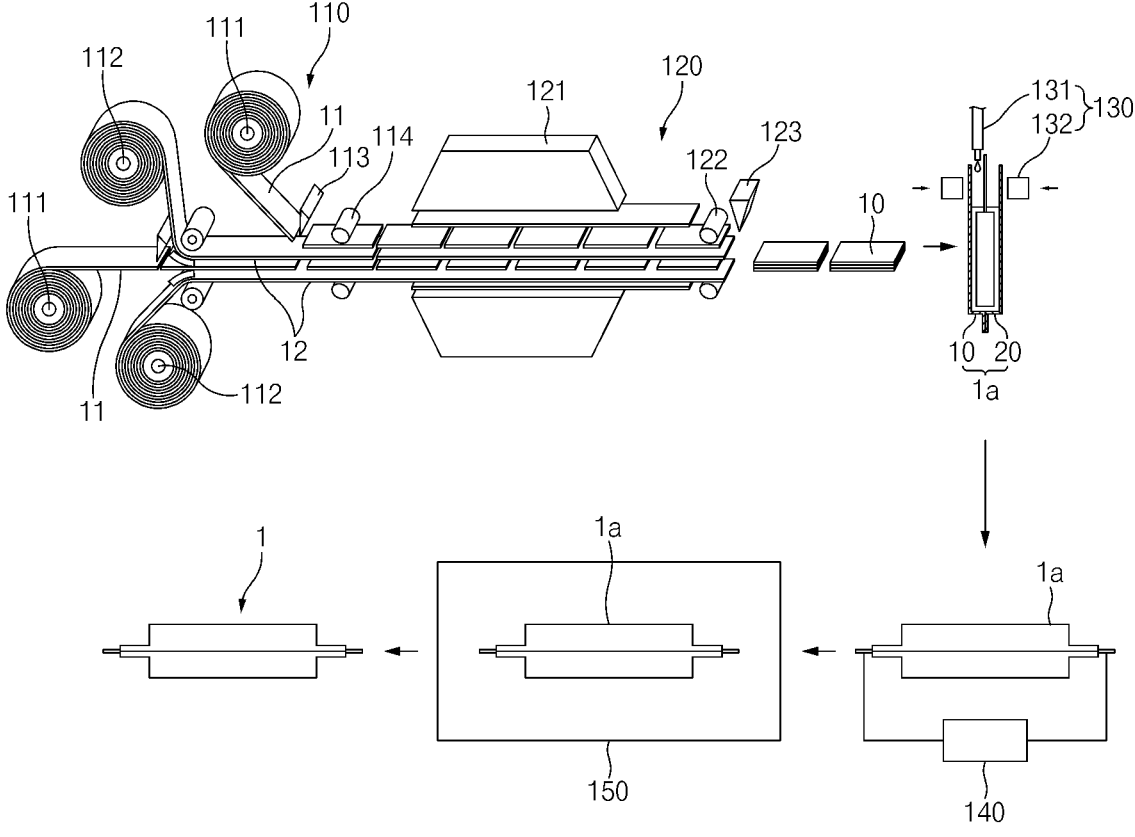
FIG. 1 is a view of equipment for manufacturing a secondary battery according to the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Equipment for Manufacturing Secondary Battery According to the Present Invention]

As illustrated in FIG. 1, equipment 100 for manufacturing a secondary battery according to the present invention comprises an electrode assembly manufacturing device 110 for manufacturing an electrode assembly 10 by alternately stacking an electrode and a separator, a lamination device 120 for laminating the electrode assembly 10 at a pressure of 5 kgf/cm$^2$ or more to bond the electrode and the separator to each other, a preliminary battery manufacturing device 130 for accommodating the electrode assembly 10 and an electrolyte 20 in a battery case 30 to manufacture a preliminary battery 1a, an activation device 140 for charging and discharging the preliminary battery 1a to activate the preliminary battery 1a, and a heat treatment device 150 for aging the preliminary battery 1a at a high temperature of 60° C. to 100° C. for 1 hour to 6 hours to manufacture a secondary battery 1.

Electrode Assembly Manufacturing Device

The electrode assembly manufacturing device 110 is configured to manufacturing the electrode assembly and comprises an electrode supply roller 111 supplying electrodes 11, a separator supply roller 112 supplying a separator 12 so that the separator 12 is disposed between the electrodes 11, a first cutter 113 cutting each of the electrodes 11 to a predetermined size, a combination roller 114 combining the cut electrodes 11 and the separator 12 to be alternately stacked.

In the electrode assembly manufacturing device 110 having the above-described configuration, the electrode and the separator are alternately stacked to manufacture the electrode assembly 10.

Lamination Device

The lamination device 120 is configured to increase in bonding strength of the electrode assembly and comprises a heating part 121 heating the electrode assembly 10 to increase up to a set temperature, a rolling roller 122 rolling the electrode assembly 10 that is heated up to the set temperature to increase in bonding strength between each of electrodes and a separator, which are provided in the electrode assembly 10, and a second cutter 123 cutting the separator 12 between the electrodes corresponding to each other to manufacture the electrode assembly 10 having a predetermined size.

Here, the rolling roller 122 laminates the electrode assembly 10 at a pressure of 5 kgf/cm$^2$ or more to bond the electrode 11 and the separator 12 to each other.

That is, in the equipment for manufacturing the secondary battery according to the present invention, the activated electrode assembly 10 may be aged at a high temperature to improve concentration polarization resistance between the electrode and the separator, which has been disturbed due to the lamination. Thus, the electrode assembly may be laminated at a pressure of 5 kgf/cm² or more, preferably, 7 kgf/cm² or more to improve lifespan performance of the electrode assembly 10.

Preliminary Battery Manufacturing Device

The preliminary battery manufacturing device 130 may comprise an injection part 131 injecting the electrolyte 20 into the battery case 30, in which the electrode assembly 10 is accommodated, and a sealing part 132 sealing an opening of the battery case 30 to manufacture the preliminary battery 1a.

Activation Device

The activation device 140 may activate the battery 1a by repeatedly charging and discharging at a set voltage to activate the preliminary battery 1a.

Here Treatment Device

The heat treatment device 150 may age the preliminary battery 1a at a high temperature of 60° C. to 100° C. for 1 hour to 6 hours to thermally treat the preliminary battery 1a, thereby manufacturing the secondary battery 1.

Hereinafter, a method of manufacturing the secondary battery according to the present invention will be described in detail with reference to the accompanying drawings.

[Method for Manufacturing Secondary Battery According to the Present Invention]

As illustrated in FIGS. 3 to 8, a method for manufacturing a secondary battery according to the present invention comprises a step or operation (a) of alternately stacking an electrode 11 and a separator 12 to manufacture an electrode assembly 10, a step or operation (b) of laminating the electrode assembly 10 at a pressure of 5 kgf/cm² or more to bond the electrode 11 and the separator 12, which are provided in the electrode assembly 10 to each other, a step or operation (c) of accommodating the electrode assembly 10 in a battery case 30 and injecting an electrolyte 20 into the battery case 30 and then sealing the battery case 20 to manufacture a preliminary battery 1a, a step or operation (d) of charging and discharging the preliminary battery 1a to activate the preliminary battery 1a, and a step or operation (e) of aging the preliminary battery 1a at a high temperature of 60° C. to 100° C. for 1 hour to 6 hours to thermally treat the preliminary battery 1a.

Step (a)

In the step (a), the electrode 11 and the separator are alternately stacked through the electrode assembly manufacturing device 110 to manufacture the electrode assembly 10. Here, the electrode 11 comprises a positive electrode and a negative electrode.

The positive electrode is manufactured by applying an electrode mixture, which is a mixture of a positive electrode active material, a conductive material, and a binder, on a positive electrode collector and then drying the electrode mixture. If necessary, a filler may be further added to the mixture.

The positive electrode active material may comprise, for example, a layered compound of lithium cobalt oxide (LiCoO₂), lithium nickel oxide (LiNiO₂), etc., or a substituted compound with one or more transition metals; lithium manganese oxide such as $Li_{1+x}Mn_{2-x}O_4$ (where, x is 0 to 0.33) $LiMnO_3$, $LiMn_2O_3$, $LiMnO_2$, etc.; lithium copper oxide ($Li_2CuO_2$); vanadium oxide such as $LiV_3O_8$, $LiFe_3O_4$, $V_2O_5$, $Cu_2V_2O_7$, etc.; Ni site-type lithium nickel oxide represented by Chemical Formula: $LiNi_{1-x}M_xO_2$ (where, M=Co, Mn, Al, Cu, Fe, Mg, B or Ga, and x=0.01 to 0.3); lithium manganese composite oxide represented by Chemical Formula: $LiMn_{2-x}M_xO_2$ (where M=Co, Ni, Fe, Cr, Zn or Ta, and x=0.01 to 0.1) or $Li_2Mn_3MO_8$ (where, M=Fe, Co, Ni, Cu or Zn); lithium manganese composite oxide having a spinel structure, which is represented by Chemical Formula: $LiNi_xMn_{2-x}O_4$; $LiMn_2O_4$ in which a portion of Li is substituted with alkaline earth ions; a disulfide compound; $Fe_2(MoO_4)_3$, and the like, but are not limited thereto.

The positive electrode collector is generally manufactured to a thickness of about 3 μm to 500 μm. The positive electrode collector may not be particularly limited as long as the material of the positive electrode collector does not cause a chemical change in the battery and has high conductivity. For example, the positive electrode collector may be made of stainless steel, aluminum, nickel, baking carbon titanium, or aluminum or stainless steel with a surface treated with carbon, nickel, titanium, or silver. The collector may have an uneven surface to improve bonding strength with an active material and be manufactured in various forms such as a film, a sheet, foil, a net, a porous body, a foam body, and a non-woven fabric.

Generally, the conductive material is added into a mixture comprising the negative electrode active material by 1 wt % to 30 wt % based on the total amount of the mixture. The conductive material may not be particularly limited as long as the material does not cause a chemical change in the battery and has conductivity. For example, the conductive material may comprise graphite such as natural graphite and artificial graphite; carbon black such as acetylene black, Ketjenblack, channel black, furnace black, lamp black, and summer black; conductive fiber such as carbon fiber and metal fiber; metal powder such as carbon fluorine, aluminum, and nickel powder; conductive whisker such as zinc oxide and potassium titanate; conductive metal oxide such as titanium oxide; or derivative of polyphenylene. Specific examples of commercially available conductive materials comprise acetylene black series (products of Chevron Chemical Company, Denka Singapore Private limited, Gulf Oil Company, etc.), Ketjenblack, EC-based series (products of Armak Company), Vulcan XC-72 (products of Cabot Company), Super P (products of Timcal Company), and the like.

The binder is a component assisting the bonding of the active material with the conductive material and the bonding with the collector, and is commonly comprised by about 1 wt % to 30 wt % based on the total amount of the mixture comprising the positive electrode active material. Examples of the binder may comprise polyfluoro vinylidene, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated EPDM, styrene butadiene rubber, fluorine rubber, various copolymers, and the like.

The filler is a component restraining the expansion of the positive electrode and is selectively used. A material not inducing the chemical change of a corresponding battery and having a fiber phase may be used without limitation. For example, olefin-based polymer such as polyethylene, polypropylene, and the like; fiber phase material such as glass fiber, carbon fiber, and the like may be used.

The negative electrode may be fabricated by performing drying and pressing after applying a positive electrode active material on a positive electrode collector. The conductive material, the binder, the filler, etc. may be selectively comprised as occasion demands.

The negative electrode active material may metal complex oxide such as at least one carbon-based material selected from the group consisting of crystalline artificial graphite, crystalline natural graphite, amorphous hard carbon, low crystalline soft carbon, carbon black, acetylene black, Ketjenblack, super P, graphene, and fibrous carbon, Si-based materials, $LixFe_2O_3$ ($0 \le x \le 1$), $Li_xWO_2$ ($0 \le x \le 1$), $Sn_xMe_{1-x}Me_yO_z$ (Me: Mn, Fe, Pb, Ge; Me: Al, B, P, Si, Group 1, Group 2, Group 3 element of the periodic table, halogen; $0 < x \le 1$; $1 \le y \le 3$; $1 \le z \le 8$); lithium metals; lithium alloys; silicon-based alloys; Tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; Li—Co—Ni-based materials; Titanium oxide; Lithium titanium oxide, and the like, but are not limited thereto.

In general, the negative electrode collector has a thickness of μm to 500 μm. The negative electrode collector may not be particularly limited so long as the material of the negative electrode collector has suitable conductivity without causing adverse chemical changes in the battery. For example, the negative electrode collector may comprise copper, stainless steel, aluminum, nickel, titanium, sintered carbon, copper or stainless steel having a surface treated with carbon, nickel, titanium, or silver, and an aluminum-cadmium alloy. Also, like the positive electrode collector, the bonding strength of the negative electrode active material may increase by forming a fine unevenness on the surface of the negative electrode collector. The negative electrode collector may have various shapes such as a film, a sheet, a foil, a net, a porous material, a foamed material, a non-woven material, and the like.

The separator is disposed between the positive electrode and the negative electrode, and an insulating thin film having high ion permeability and mechanical strength is used as the separator. In general, the separator may have a pore diameter of 0.01 μm to 10 μm and a thickness of 5 μm to 300 μm. For example, a sheet or non-woven fabric made of an olefin polymer such as polypropylene, a glass fiber, or polyethylene, which has chemical resistance and hydrophobicity, may be used as the separator. When a solid electrolyte such as a polymer is used as the electrolyte, the solid electrolyte may also function as the separator.

The electrode assembly 10 having the above-described configuration may be a stacked electrode assembly in which the positive electrode, the separator, the negative electrode, the separator, and the positive electrode are sequentially stacked, a jelly-roll type electrode wound with the separator interposed between a positive electrode sheet and a negative electrode sheet, or a stack-folding electrode assembly having a structure in which a bi-cell and/or a full cell are/is manufactured and then wound as a separation film.

MANUFACTURE EXAMPLE

Manufacture of Positive Electrode 0.5Li2MnO3.0.5Li(Ni0.45Mn0.35Ni0.20)O2 is used as the positive electrode active material, and then, the positive electrode active material, the conductive material (carbon black), and the binder (PVdF) are put in a weight ratio of 90:5:4 into NMP (N-methyl-2-pyrrolidone) and mixed with each other to manufacture a positive electrode mixture. Next, the positive electrode mixture is applied on aluminum foil having a thickness of 20 μm to a thickness of 80 μm and then rolled and dried to manufacture a positive electrode.

Manufacture of Negative Electrode

Artificial graphite is used as the negative electrode active material, and then, the negative electrode active material, the conductive material (carbon black), and the binder (PVdF) are put in a weight ratio of 95:3:2 into NMP (N-methyl-2-pyrrolidone) and mixed with each other to manufacture a negative electrode mixture. Next, the negative electrode mixture is applied on copper foil having a thickness of 20 μm to a thickness of 80 μm and then rolled and dried to manufacture a negative electrode.

Manufacture of Electrode Assembly

An electrode 11 comprising the positive electrode and the negative electrode, which are manufactured as described above, and a separator 12 (DB0901, BA1 SRS composition, thickness: 18 μm, fabric thickness: 9 μm, applied to a thickness of 4.5 μm per one side of SRS so as to have total thickness of 9 μm) are supplied to be alternately stacked through the electrode assembly manufacturing device 110 to manufacture the electrode assembly 10.

Step (b)

In the step (b), the electrode assembly 10 is laminated at a pressure of 5 kgf/cm² or more, preferably 7 kgf/cm² or more using the lamination device 120 to bond the electrode 11 and the separator 12, which are provided in the electrode assembly 10, to each other.

Experimental Example 1

Figure 3:
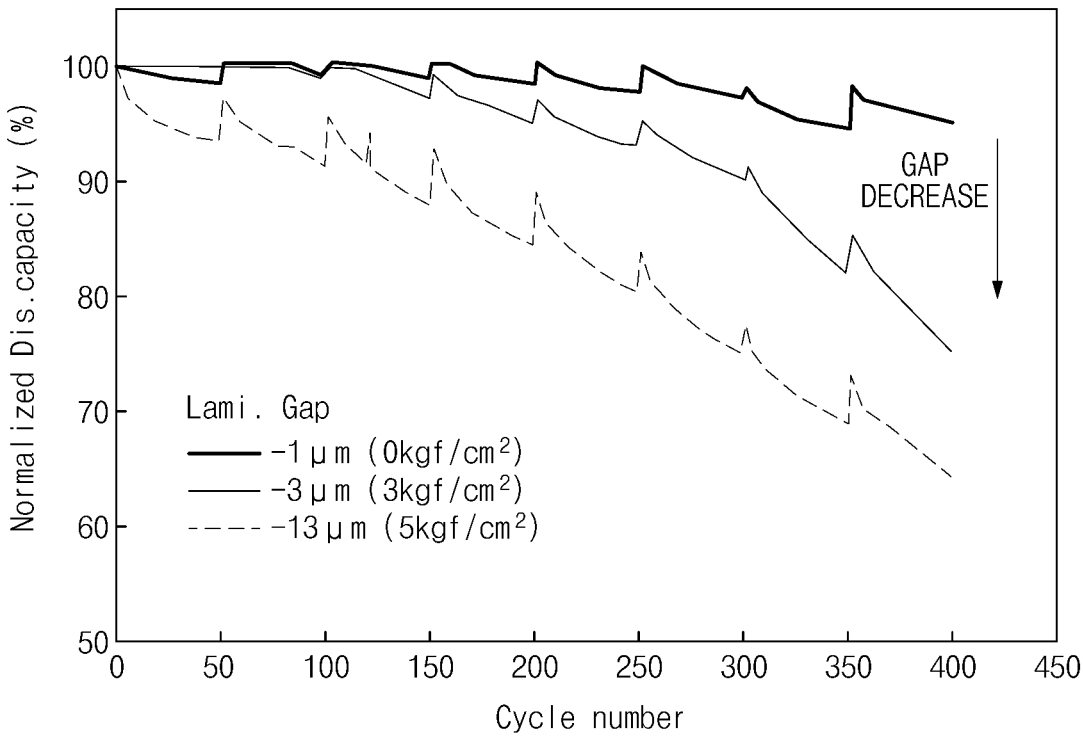
FIG. 3 is a graph illustrating cycle characteristics according to Experimental Examples 1 and 2.

A change in gap and bonding strength between the electrode 11 and the separator 12, which are provided in the electrode assembly 10, by laminating the electrode assembly 10 at a pressure of 3 kgf/cm² is illustrated in a graph of FIG. 3.

Experimental Example 2

A change in gap and bonding strength between the electrode 11 and the separator 12, which are provided in the electrode assembly 10, by laminating the electrode assembly 10 at a pressure of 5 kgf/cm² or more is illustrated in a graph of FIG. 3.

Comparative Example 1

A change in gap between the electrode 11 and the separator 12, which are provided in the electrode assembly 10, in a state in which the electrode assembly 10 is not laminated is illustrated in FIG. 3.

As a result, referring to FIG. 3, according to the present invention, it is confirmed that the gap between the electrode and the separator is significantly reduced when comparing the case in which the electrode assembly 10 is laminated at the pressure of 5 kgf/cm² or more to the case in which the lamination is not performed. Here, the bonding strength (gf/20 mm) in Comparative Example 1 is 0, the bonding strength (gf/20 mm) in Experimental Example 1 is 6.7, and the bonding strength (gf/20 mm) of Experimental Example 2 is 70.8. That is, when process performance is remarkably improved, it is confirmed that lifespan performance is remarkably reduced.

Step (c)

In the step (c), the electrode assembly 10 is accommodated in the battery case 30 using the preliminary battery manufacturing device 130, and the electrolyte 20 is injected into the battery case 30, and then the battery case 20 is sealed to manufacture the preliminary battery 1a.

A non-aqueous electrolyte is used as the electrolyte. Here, the non-aqueous electrolyte is composed of a liquid electrolyte and a lithium salt, and a non-aqueous organic solvent is used as the liquid electrolyte.

For example, the non-aqueous organic solvent may comprise an aprotic organic solvent such as N-methyl-2-pyrrolidone, propylene carbonate, ethylene carbonate, butylene carbonate, dimethyl carbonate, diethyle carbonate, gamma-butyrolacton, 1,2-dimethoxy ethane, tetrahydroxy franc, 2-methyl tetrahydrofuran, dimethyl sulfoxide, 1,3-dioxolane, formamide, dimethyl formamide, dioxolane, acetonitrile, nitromethane, methyl formate, methyl acetate, phosphoric acid tri-ester, trimethoxy methane, dioxolane derivatives, sulfolan, methyl sulfolan, 1,3-dimethyl-2-imidazolidinone, a propylene carbonate derivative, a tetrahydrofuran derivative, ether, methyl propionate, ethyl propionate, and the like.

The lithium salt is a material that is capable of being easily dissolved in the non-aqueous electrolyte. For example, the lithium salt may comprise LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$) 2NLi, chloroborane lithium, lower aliphatic carboxylic acid lithium, 4-phenyl lithium borate, an imide, and the like.

Further, the following compounds may be added to the electrolyte so as to improve discharge and charge characteristics, flame retardancy, and the like. Examples of the compounds may comprise pyridine, triethyl phosphite, triethanolamine, cyclic ether, ethylenediamine, n-glyme, hexaphosphoric triamide, a nitrobenzene derivative, sulfur, a quinone-imine dye, N-substituted oxazolidinone, N,N-substituted imidazolidine, ethylene glycol dialkyl ether, an ammonium salt, pyrrole, 2-methoxyethanol, aluminum trichloride, and the like. In some cases, in order to impart non-flammability, a halogen-containing solvent such as carbon tetrachloride, ethylene trifluoride, and the like may be further contained, and in order to improve high-temperature storage characteristics, carbon dioxide gas may be further contained. In addition, FEC (fluoro-ethylene carbonate), PRS (propene sultone), FEC (fluoro-ethylene carbonate), and the like may be further contained.

That is, in the step (c), the electrode assembly is accommodated in the pouch-type battery case, ethyl carbonate, dimethyl carbonate, and ethyl methyl carbonate are mixed in a volume ratio of 1:1:1, and a non-aqueous electrolyte containing 1M of LiPF6 as a lithium salt is added to manufacture the preliminary battery 1a.

Step (d)

The step (d) is performed to activate the preliminary battery by charging and discharging the preliminary battery and comprises a process (d1) of primarily charging the preliminary battery 1a, a process (d2) of primarily aging the primarily charged the preliminary battery 1a at room temperature of 23° C. to 27° C., a process (d3) of primarily aging the preliminary battery 1a at a high temperature of 50° C. to 80° C. after the process (d2), a process (d4) of secondarily aging the preliminary battery 1a at room temperature of 23° C. to 27° C. after the process (d3), and a process (d5) of primarily discharging the preliminary battery 1a after the process (d4). The preliminary battery 1a may be activated through the above-described processes.

Here, the aging processes are performed to improve ionic conductivity of the separator through sufficient impregnation of the electrolyte.

The step (d) may comprise a process of charging and discharging the preliminary battery 1a one or more times and a process of degassing the preliminary battery 1a. Here, the degassing may be performed by the aging.

In addition, an additional degassing process may be further performed between the process (d4) and the process (d5), and the additional degassing may further comprises a process of opening the battery case of the preliminary battery and a process of sealing the battery case again.

That is, due to the charging according to activation process, the electrode active material is activated, and the electrolyte is decomposed to generate a gas within the battery. Thus, a step of removing the gas, i.e., a degassing process is required. Here, even in the aging process of leaving the preliminary battery, a considerable amount of generated gas may be removed.

The degassing may also be performed by the aging process of leaving the preliminary battery.

The process (d1) is performed up to SOC 10 to SOC 100. In detail, the process (d1) may be performed up to SOC 25 to SOC 35. This is because initial charge for the activation does not need to be fully charged, a passivation layer that is sufficiently stable within the above range is formed, initial gas generation is induced, and it is preferable in terms of process efficiency.

In order to perform stabilization of the passivation layer formed through the impregnation of the electrolyte, the generation of the initial gas, and the initial charging, in the aging processes, the process (d2) is performed for 1 day to 5 days, the process (d3) is performed for 10 hours to 30 hours, the process (d4) is performed for 10 hours to 30 days, and the process (d5) is performed to be discharged to 6.5 C for 1 minute at SOC 90.

When the aging process is completed, the preliminary battery is primarily discharged. Here, the primary discharge is performed to be completely discharged to about SOC 0.

In summary, in the step (d), the preliminary battery 1a is primarily charged to SOC 30 and aged at room temperature of 25° C. for 3 days. Next, after the preliminary battery 1a is aged at a high temperature of 60° C. for 24 hours and then aged again at room temperature of 25° C. for 20 days, a portion of the pouch-type battery case is opened to perform the degassing, and then, the preliminary battery 1a is primarily discharged to SOC 0. Thereafter, the process of charging the preliminary battery to SOC 100 and discharging the preliminary battery to SOC 0 is repeated two more times to complete the activation process.

Embodiment 1

The activated preliminary battery 1a is charged up to SOC 30 in a shipping state to manufacture a secondary battery and then is aged at a high temperature of 80° C. for 1 hour.

Embodiment 2

The activated preliminary battery 1a is charged up to SOC 30 in a shipping state to manufacture a secondary battery and then is aged at a high temperature of 80° C. for 3 hours.

Embodiment 3

The activated preliminary battery 1a is charged up to SOC 30 in a shipping state to manufacture a secondary battery and then is aged at a high temperature of 80° C. for 6 hours.

Comparative Example 2

The activated preliminary battery 1a is charged up to SOC 30 in a shipping state to manufacture a secondary battery, and no separate treatment is performed.

Experimental Example 3

Figure 4:
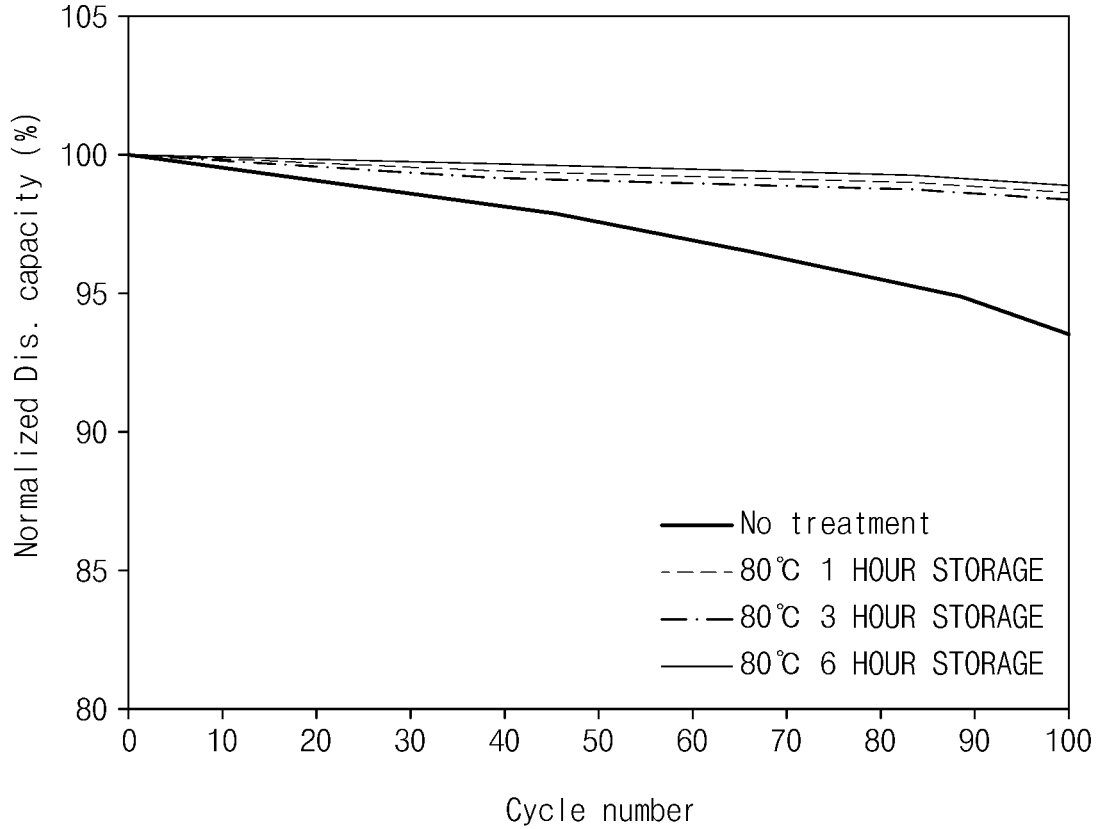
FIGS. 4 to 6 are graphs illustrating cycle characteristics according to Experimental Example 3.
Figure 5:
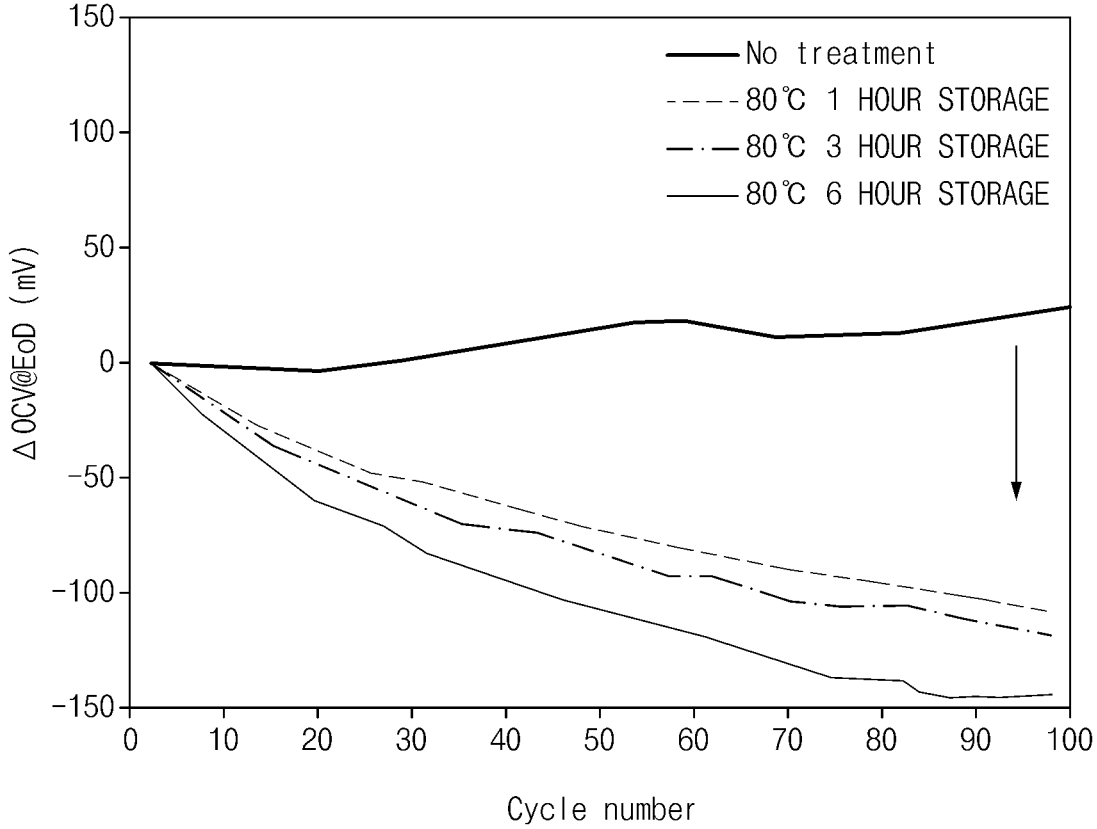
Figure 6:
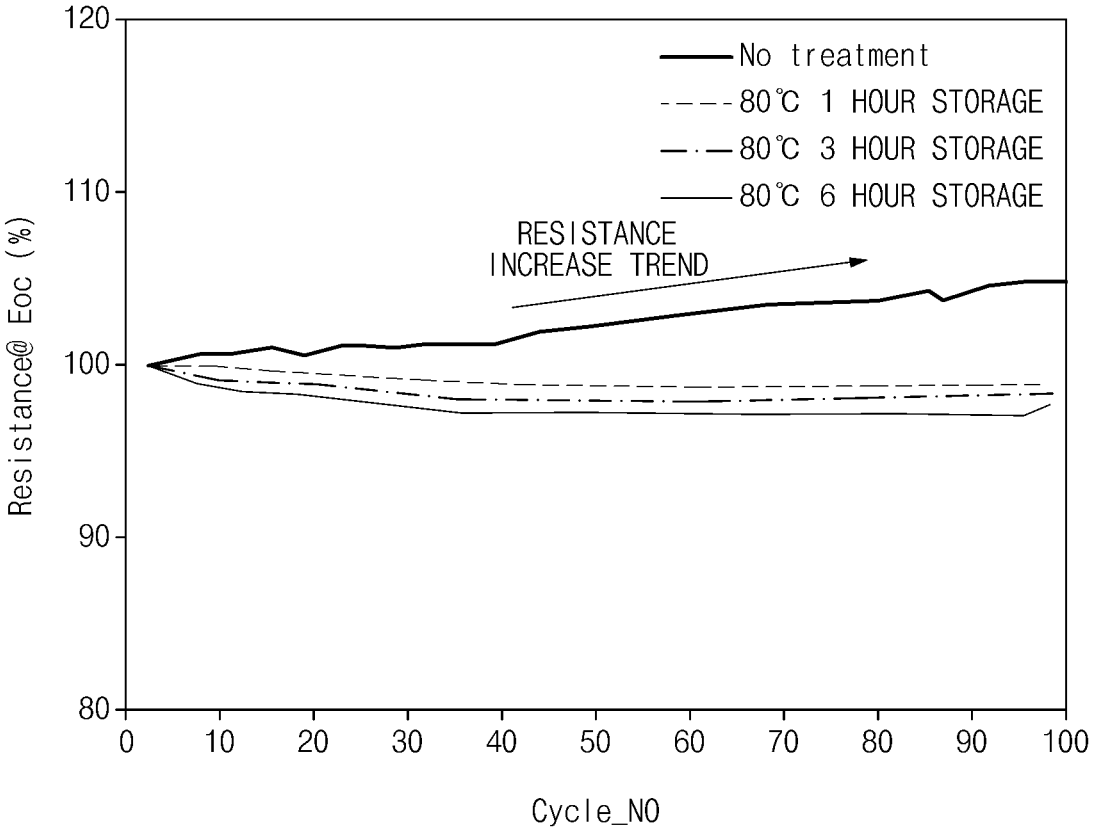

The cycle characteristics of the secondary batteries manufactured in Experimental Examples 1 to 3 and Comparative Example 2 are evaluated and illustrated in graphs of FIGS. 4 to 6.

Cycle characteristics such as a capacity retention rate according to a cycle, a change in OCV at a voltage EOD maintained during the rest after discharging, and resistance increase rate are measured. A process of charging the secondary battery up to 4.2 V at 0.33 C and discharging the secondary battery up to 2.5 V at 0.33 C is repeated 100 times to measure the above-described cycle characteristics.

Referring to the cycle characteristics of FIG. 4, it is seen that in Examples 1 to 3, the capacity retention rate according to the cycle is maintained when compared to Comparative Example 2.

Referring to the cycle characteristics of FIG. 5, it is seen that the change in OCV in the voltage EOD maintained during the rest after the discharging decreases.

Referring to the cycle characteristics of FIG. 6, it is seen that the resistance decreases in the case in which the high-temperature aging is performed in the activation step when compared to a case in which the high-temperature aging is not performed. Accordingly, it is confirmed that the lifespan characteristics are remarkably improved.

Of course, there is a difference in the OCV value, but it is seen that there is no significant difference in the change value when the storage is stored for 1 hour to 6 hours in terms of the capacity retention rate or the resistance increase according to the cycle.

Therefore, the lifespan characteristics may be improved even for the aging time of about 1 hour.

Experimental Example 4

After measuring the change in discharge capacity to confirm the difference in concentration polarization resistance while discharging the secondary battery manufactured in Experimental Example 3 and Comparative Example 1 to 6.5 C for 1 minute for each period of changing from SOC 90 to SOC 10 by a value of 10, the results are illustrated in a graph of FIG. 7 below.

Figure 7:
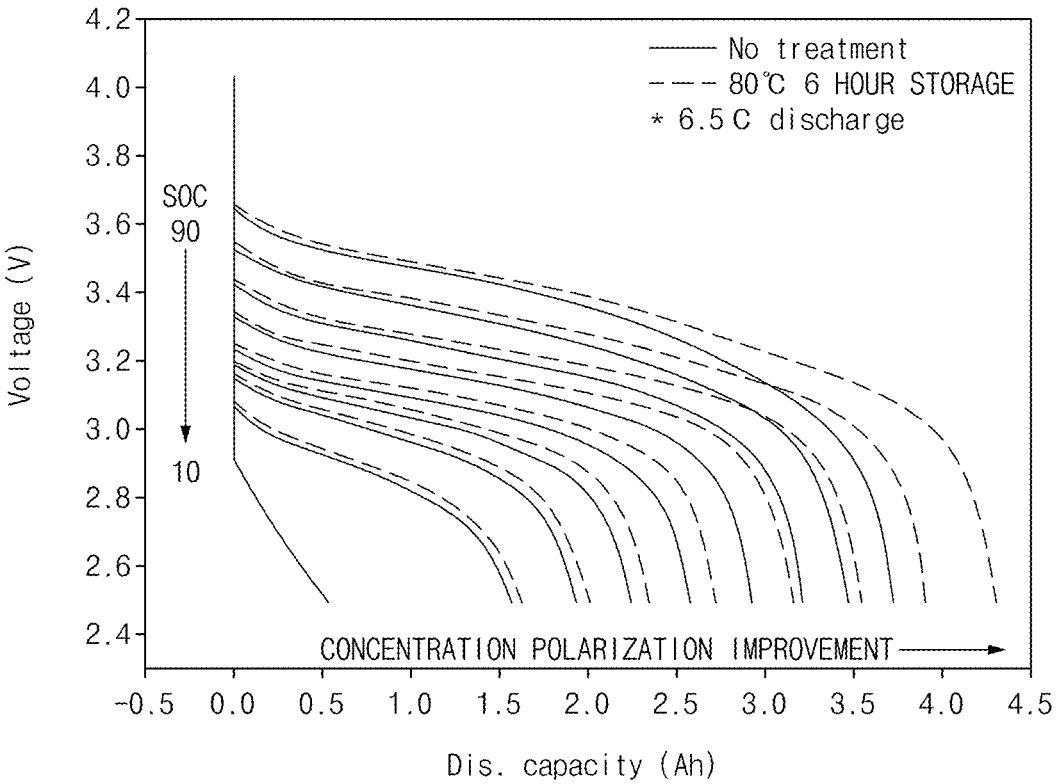
FIG. 7 is a graph illustrating discharge capacity for confirming concentration polarization resistance in a state of charge (SOC) section according to Experimental Example 4.

Referring to FIG. 7, it is seen that when high-temperature aging is performed, a high discharge capacity is exhibited. It is determined that this is because the ion conductivity of the separator is improved, and the concentration polarization resistance is improved.

Step (e)

In the step (e), the preliminary battery 1a is thermally treated by aging the preliminary battery 1a at a high temperature of 60° C. to 100° C. for 1 hour to 6 hours. Accordingly, the secondary battery 1 may be manufactured.

The high-temperature aging in the step (e) may be performed for 1 hour to 5 hours, more specifically 1 hour to 3 hours.

When performed for too little time, the intended effect of the present invention may not be obtained, but when performed for too long time, the intended effect of the present invention may be achieved by performing the process for 1 hour or more. As a result, it is seen that there is a large difference. On the other hand, since the process time increases, it is not preferable.

Therefore, the process may be performed for 1 hour to 6 hours, and in consideration of the process properties, it is more preferable that the process is performed for 1 hour to 3 hours.

The high-temperature aging in the step (e) may be performed at a temperature of 60° C. to 100° C., preferably 75° C. to 90° C.

If the temperature is lower than the above temperature, the time is too long, or the temperature is not enough to apply deformation to the separator. Thus, it is difficult to achieve the intended effect of the present invention. On the other hand, if the temperature is too high, it may be affected on the active material and the like, and thus, the battery performance may be deteriorated.

In other words, the present invention may achieve the intended effect by only aging the secondary battery at the high temperature in the state of SOC 25 to SOC 35, which is in the shipping charge state, after the activation process has been completed. As a result, the deterioration of the battery performance, which may occur by the strong lamination when the secondary is manufactured, may be recovered nondestructively.

Experimental Example 5

Figure 8:
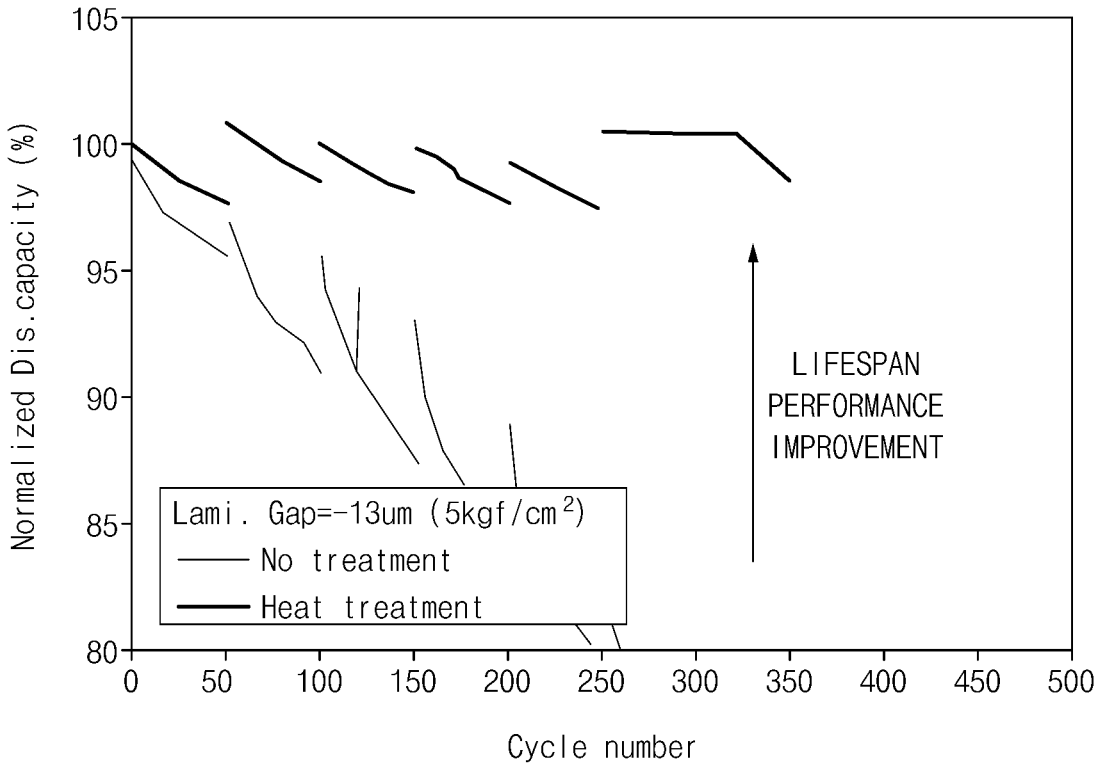
FIG. 8 is a graph illustrating high-temperature aging according to Experimental Example 5.

The preliminary battery 1a comprising the electrode assembly laminated at a pressure of 5 kgf/cm² is aged at a high temperature of 75° C. for 3 hours, and the change in cycle is illustrated in a graph of FIG. 8.

Comparative Example 3

The preliminary battery 1a comprising the electrode assembly laminated at a pressure of 5 kgf/cm² is not separately treated.

As a result, referring to FIG. 8, it is seen that when the high-temperature aging is performed, the cycle that has deteriorated due to the lamination is recovered.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

The invention claimed is:

1. A method for manufacturing a secondary battery, the method comprising:

an operation (a) of alternately stacking an electrode and a separator to manufacture an electrode assembly;

an operation (b) of laminating the electrode assembly at a pressure of 5 kgf/cm² or more to bond the electrode and the separator, which are provided in the electrode assembly, to each other;

an operation (c) of accommodating the electrode assembly in a battery case after operation (b) and injecting an electrolyte into the battery case to seal the battery case, thereby manufacturing a preliminary battery;

an operation (d) of charging and discharging the preliminary battery to activate the preliminary battery, and including a degassing process; and an operation (e) of aging the preliminary battery at a temperature of 60° C. to 100° C. for 1 hour to 6 hours to thermally treat the preliminary battery, wherein, in operation (d), the charging and discharging is performed from SOC 25 to SOC 100, wherein the operation (d) comprises:

a process (d1) of primarily charging the preliminary battery;

a process (d2) of primarily aging the primarily charged preliminary battery at room temperature of 23° C. to 27° C.;

a process (d3) of primarily aging the preliminary battery at a temperature of 50° C. to 80° C. after the process (d2);

a process (d4) of secondarily aging the preliminary battery at the room temperature of 23° C. to 27° C. after the process (d3);

a process (d5) of primarily discharging the preliminary battery after the process (d4); and an additional degassing process between the process (d4) and the process (d5), and wherein the operation (d) is repeated two or more times.

2. The method of claim 1, wherein, in operation (e), the temperature aging is performed for 1 hour to 3 hours.

3. The method of claim 1, wherein, in operation (e), the temperature aging is performed at a temperature of 75° C. to 90° C.

4. The method of claim 1, wherein the degassing process is further performed by the temperature aging.

5. The method of claim 1, wherein the additional degassing process comprises a process of opening the battery case of the preliminary battery and a process of sealing the battery case again.

6. The method of claim 1, wherein the process (d1) is performed from SOC 25 to SOC 35.

7. The method of claim 1, wherein the process (d2) is performed for 1 day to 5 days.

8. The method of claim 1, wherein the process (d3) is performed for 10 hours to 30 hours.

9. The method of claim 1, wherein the process (d4) is performed for 10 hours to 30 days.

10. The method of claim 1, wherein the process (d5) is performed to be discharged to 6.5 C for 1 minute at SOC 90.

11. The method of claim 1, wherein, in operation (e), the temperature aging is performed at a temperature of greater than 80° C.

12. The method of claim 1, wherein, in operation (e), the secondary battery is aged in a state of SOC 25 to SOC 35 after operation (d) has been completed.

13. The method of claim 1, wherein the degassing process is performed by each aging of the preliminary battery in operation (d).

\* \* \* \* \*